United States Patent [19]
Harada et al.

[11] Patent Number: 5,694,858
[45] Date of Patent: Dec. 9, 1997

[54] RAILWAY VEHICLE WITH MICRO PRESSURE WAVE REDUCING CONTOUR FOR TUNNEL TRAVEL

[75] Inventors: Iwao Harada, Mito; Morishige Hattori, Kudamatsu; Kazuhiko Hiraoka, Kodaira; Hideshi Ooba, Kudamatsu, all of Japan

[73] Assignee: Hitachi, Ltd., Tokyo, Japan

[21] Appl. No.: 589,973

[22] Filed: Jan. 23, 1996

[30] Foreign Application Priority Data

Jan. 23, 1995 [JP] Japan .................................. 7-007958

[51] Int. Cl.$^6$ ............................................ B61D 17/02
[52] U.S. Cl. ........................................ 105/1.1; 244/130
[58] Field of Search ........................ 105/1.1; 296/180.1; 244/119, 130

[56] References Cited

U.S. PATENT DOCUMENTS 2,256,493  9/1941  Ragsdale et al. .................... 105/1.1

FOREIGN PATENT DOCUMENTS

| 1941643 | 2/1971 | Germany . |
| 61161 | 3/1991 | Japan . |
| 5-124511 | 5/1993 | Japan . |
| 679922 | 5/1992 | Switzerland . |

OTHER PUBLICATIONS

The International Conference on Speedup Technology for Railway and Maglev Vehicles Nov. 22-26, 1993, vol. 2.

*Primary Examiner*—S. Joseph Morano
*Attorney, Agent, or Firm*—Antonelli, Terry, Stout & Kraus, LLP.

[57] ABSTRACT

To provide a high speed vehicle having a nose shape which reduces a pressure gradient of a micro pressure wave and secures the capacity necessary for each of the driver's cab and the passenger's cabin and the visibility necessary for driving, a nose shape is proposed having a tip region, an intermediate region and a rear region, respectively. The change rate of the sectional area from the tip toward the rear end is maximal in the tip region and progressively decreases towards the intermediate region and the rear region.

10 Claims, 11 Drawing Sheets

DISTANCE FROM A NOSE POINT

CROSS SECTION AREA OF BODY

DISTANCE FROM A NOSE POINT

DERIVATIVE OF CROSS SECTION AREA

DISTANCE FROM A NOSE POINT

CROSS SECTION AREA OF BODY

DISTANCE FROM A NOSE POINT

DERIVATIVE OF CROSS SECTION AREA

DISTANCE FROM A NOSE POINT

CROSS SECTION AREA OF BODY

DISTANCE FROM A NOSE POINT

DERIVATIVE OF CROSS SECTION AREA

DISTANCE FROM A NOSE POINT

CROSS SECTION AREA OF BODY

DISTANCE FROM A NOSE POINT

DERIVATIVE OF CROSS SECTION AREA

DISTANCE FROM A NOSE POINT

CROSS SECTION AREA OF BODY

DISTANCE FROM A NOSE POINT

DERIVATIVE OF CROSS SECTION AREA

RAILWAY VEHICLE WITH MICRO PRESSURE WAVE REDUCING CONTOUR FOR TUNNEL TRAVEL

BACKGROUND OF THE INVENTION

This invention relates to a nose shape of a vehicle, and more specifically to a nose shape suitable for railway vehicles running at a high speed, such as high speed trains.

The running speed of high speed trains was about 200 km/h at the initial stage, but has been increased to about 270 km/h for the latest high speed trains, and a further increase is being attempted. As the running speed of the vehicle becomes higher and higher, the shape of the vehicle and the flow of air around the vehicle are associated more closely with each other, and this relation can be broadly classified into the following two cases.

The first is the case where the vehicle travels in a broad space such as when it runs in an environment referred to as a "free-field" devoid of any tunnels. In this case, the influences of the surroundings are not great, and the flow of air induced by the shape of the tip becomes important for the nose shape. In other words, the nose shape must have a small air resistance so as to reduce power required for running the vehicle at a high speed.

The second is the case where the vehicle travels in a narrow and limited space such as when it enters a tunnel. In this case, the leading vehicle plays the role of a piston in the tunnel and is greatly affected by the tunnel. In other words, air at the leading part of the vehicle is gradually compressed between the vehicle and the tunnel, and propagates as a weak compression wave referred to as a "micro pressure wave" at an acoustic velocity higher than the vehicle speed inside the tunnel. A part of this micro pressure wave is reflected by the tunnel exit and its major portion is discharged as sound outside the tunnel. In this case, it is very important to reduce the micro pressure wave discharged outside the tunnel in order to reduce the influences of the high speed vehicles on the environment.

To reduce the air resistance as a first problem, various shapes have been proposed for the nose shape of the high speed vehicles.

As a first example, Japanese Patent Laid-Open No. 124511/1993 describes a nose sharpe of a linear motor car wherein the angle of the distal end portion is made small but is gradually increased in such a manner as to "scoop up" air.

Because the linear motor car is driven by superconducting magnets in place of the wheels of the high speed trains, vertical walls formed by aligning electromagnets and referred to as a "guideway" are disposed on both side surfaces of the vehicle. The truck portion of the vehicle is encompassed by the roadbed and guideways at both ends, and the gap between the car body and these members is small. Therefore, the influences of the guideways are great. Because the guideways exist, air at the tip portion cannot escape from both side surfaces of the vehicle, and the nose shape indispensably becomes one that scoops up air above the guideways.

As a second example, Japanese Patent Laid-Open No. 61161/1991 discloses a nose shape similar to the nose shape of a high speed train, wherein the nose portion is disposed at a height spaced above the ground surface so that air at the tip portion is divided into four directions, that is, upper, lower, right and left directions, and is caused to flow in each direction. Because the guideways are not provided on a high speed train, unlike a linear motor car, the flows of air divided to the right and the left at the nose portion pass along the side surfaces of the car body without any change and consequently, the air resistance can be reduced.

As a third example, the reference 1 described below discloses a nose shape of a linear motor car wherein the tip portion is cut and rounded on the basis of the leading shape having a basic geometric shape, such as an ellipsoid of revolution. This nose shape can resolve the second problem, and is based on the experimental result that the tip portion hardly exerts any influences when the vehicle enters the tunnel.

Reference 1: Tatuo Maeda et al., "Effect of Shape of Train Nose on Compression Wave generated by Train Entering Tunnel" (The International Conference on Speedup Technology for Railway and MAGLEV Vehicles, 1993, Yokohama, Japan.

Each of the first and second examples addresses the first problem and relates to a nose shape for reducing the air resistance, but does not consider the nose shape at the time of entering a tunnel. The second example provides a nose shape which is affected by the guideways inherent to a linear motor car, and effective effects cannot be expected in the case of high speed vehicles not using guideways.

The third example considers the nose shape at the time of entering a tunnel from the point of view the second problem, but it provides a nose shape which attaches much importance to the influences of the guideways inherent to the linear motor car in the same way as the second example.

SUMMARY OF THE INVENTION

It is an object of the present invention to provide a high speed vehicle having a nose shape for reducing a micro pressure wave generated by a tunnel and the vehicle when the electric vehicle enters the tunnel.

It is another object of the present invention to provide a high speed vehicle which reduces the generated fine atmospheric pressure wave and secures the front visibility via a windshield of the driver's cab which is comparable to that when a sharper nose shape is used.

In a railway vehicle having a nose portion whose projected sectional area (hereinafter referred to as a "car body cross-sectional area") increases progressively starting at the distal end of the car body in a car body longitudinal direction, the objects described above can be accomplished by a railway vehicle having a construction wherein the nose portion comprises a tip region and an intermediate region, and wherein the tip region exists on the distal end side of a position at which a sectional area is a half of the maximum cross-sectional area of the car body, the intermediate region exists on the other end of the tip region in the car body longitudinal direction, the car body cross-sectional area changes at a predetermined sectional area change rate in the intermediate region, and a sectional area change rate of the tip region is greater than a sectional area change rate of the intermediate region.

In a railway vehicle having a nose portion at which the car body cross-sectional area increases starting at tip of the car body in a car body longitudinal direction, the objects described above can be accomplished by a railway vehicle having a construction wherein the nose portion comprises a tip region, an intermediate region and a rear region each trisected in a car body longitudinal direction, and wherein the sectional area change rate in the tip region is greater than the sectional area change rate of the intermediate region, and the sectional area change rate of the rear region is greater than the sectional area change rate of the intermediate region.

In a railway vehicle having the nose portion at which a car body cross-sectional area increases starting at the tip of the car body in a car body longitudinal direction, the objects described above can be accomplished by a railway vehicle having a construction wherein the nose portion comprises a tip region and an intermediate region, and wherein the intermediate region contains a position at which the car body cross-sectional area is a half of the maximum car body cross-sectional area, and the sectional area change rate of the intermediate region is smaller than the sectional area change rate of the tip region.

In a railway vehicle having the nose portion at which a car body cross-sectional area progressively increases from the tip of the car body toward the other end in the car body longitudinal direction, the objects described above can be accomplished by a railway vehicle having a construction wherein the nose portion comprises a tip region, an intermediate region and a rear region, and wherein the intermediate region contains a position at which the car body cross-sectional area is a half of the maximum car body cross-sectional area, and the sectional area change rates of the tip region and the rear region are greater than the sectional area change rate of the intermediate region.

To accomplish the objects described above, the present invention employs a nose shape such that the driver's cab is defined within a range in which the car body cross-sectional area changes starting at the distal end portion of the car body in the car body longitudinal direction, the car body cross-sectional area changes so that a sectional area change rate of the portion, which contains at least a position at which the sectional area is a half of the maximum car body cross-sectional area, becomes constant, the sectional change rate of the tip portion is greater than that of the portion at which the sectional area change rate of the car body cross-sectional area is constant, and the sectional area change ratio of the portion on the central side in the car body longitudinal direction becomes smaller at the portion at which the sectional area change rate of the car body cross-sectional area becomes constant.

The present invention provides a nose shape wherein the sectional area change rate is constant at the central portion, the car body width of the side surface portions of the driver's cab is reduced, and the windshield of the driver's cab is set to an angle ensuring good visibility ahead.

The driver's cab is formed in the nose portion in which the car body cross-sectional area changes starting at the distal end of the car body in the car body longitudinal direction. Further, this driver's cab is defined in the intermediate region when the nose portion is divided into three equal parts with respect to distance in the car body longitudinal direction. The angle of inclination of the windshield of the driver's cab is set to ensure a front visibility by the driver, and recess portions are formed below the both side portions of the windshield.

DETAILED DESCRIPTION

The present invention provides an optimum nose shape on a basis of the theory relating to the correlationship between the sectional area change rate of the nose shape and the micro pressure wave generated thereby in order to reduce the micro pressure wave.

First, an explanation will be given as to what phenomenon occurs between the tunnel and the vehicle when the vehicle enters the tunnel.

Figure 1:
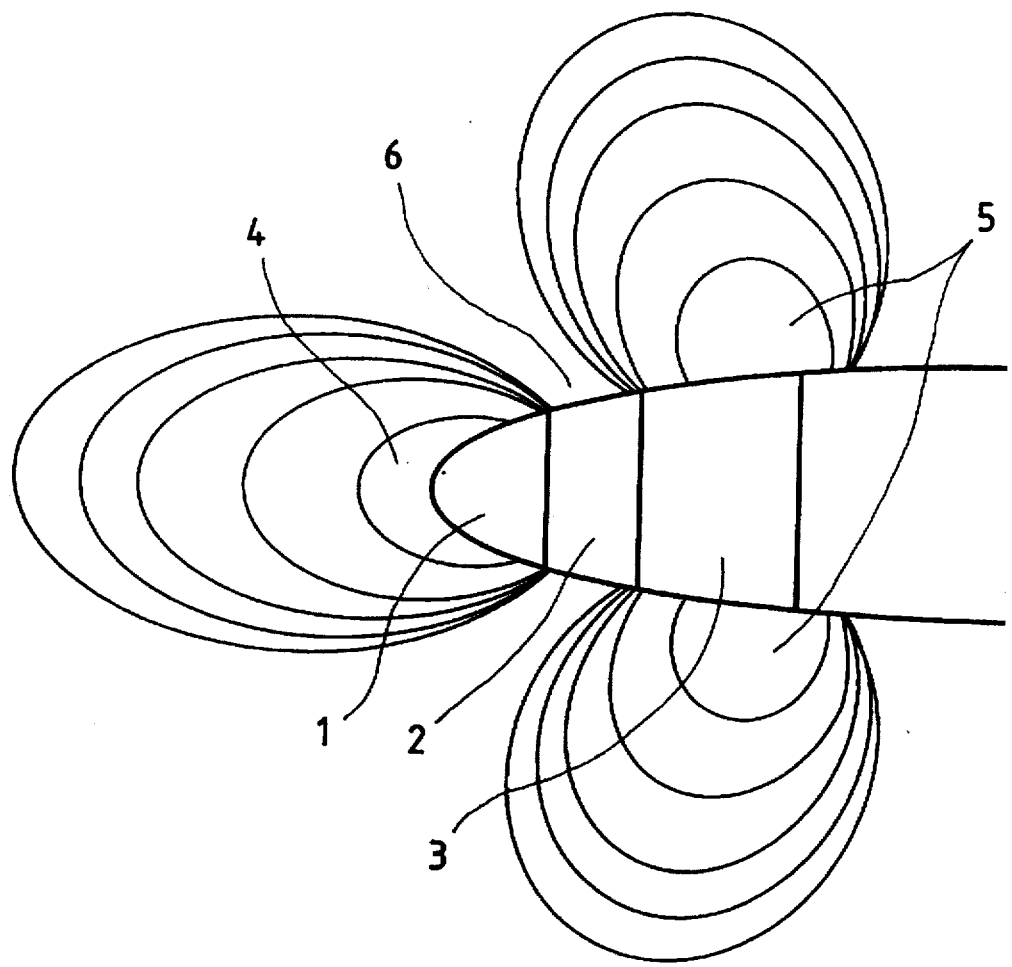
FIG. 1 is a schematic view of a pressure distribution occurring around a travelling obstacle.

FIG. 1 schematically illustrates an isobar distribution occurring around a vehicle when the vehicle simulated by an axisymmetric obstacle travels inside a bright zone. It will be assumed hereby that the nose shape is defined by dividing it into a tip region 1, an intermediate region 2 and a rear region 3 starting at the distal end.

In the front region inclusive of the tip region 1 and referred to as a "stagnation region", the flow of air is stopped and retardation occurs. Kinetic energy after this retardation changes to a pressure, so that the pressure in the tip region 1 becomes higher than the pressure of a uniform flow (flow having the same velocity as the speed of the vehicle). This will be referred to as a "high pressure zone 4".

In a rearward region inclusive of the rear region 3, on the other hand, the cross-sectional area of the car body does not increase any more towards the back, so that the flow of air is not impeded. Accordingly, the pressure that has been increasing is converted to kinetic energy contrary to the tip region 1, and the pressure becomes lower than the pressure of the uniform flow. This will be referred to as a "low pressure zone 5".

The zone which shifts from the high pressure zone 4 to the low pressure zone 5 is a transition zone 6. This transition zone 6 is at the intermediate region 2 containing the position at which the maximum car body cross-sectional area rate projected in the flow direction is about ⅓ in the case of an axisymmetric obstacle and is about ⅘ in the case of a sphere, though the value is different depending on the shape of the obstacle. Since the air pressure changes with the transition zone 6 as the boundary, it could be understood that this region is extremely important.

Next, before the vehicle enters a tunnel, this pressure distribution moves with the vehicle until the nose portion approaches the tunnel entrance, and the high pressure zone 4 is changed to a micro pressure wave inside the tunnel.

Accordingly, since the development of the high pressure zone is governed by the transition region 6, it is important to correctly design the sectional shape of this intermediate region 2 in contact with the transition region 6 in order to reduce the micro pressure wave.

Figure 2:
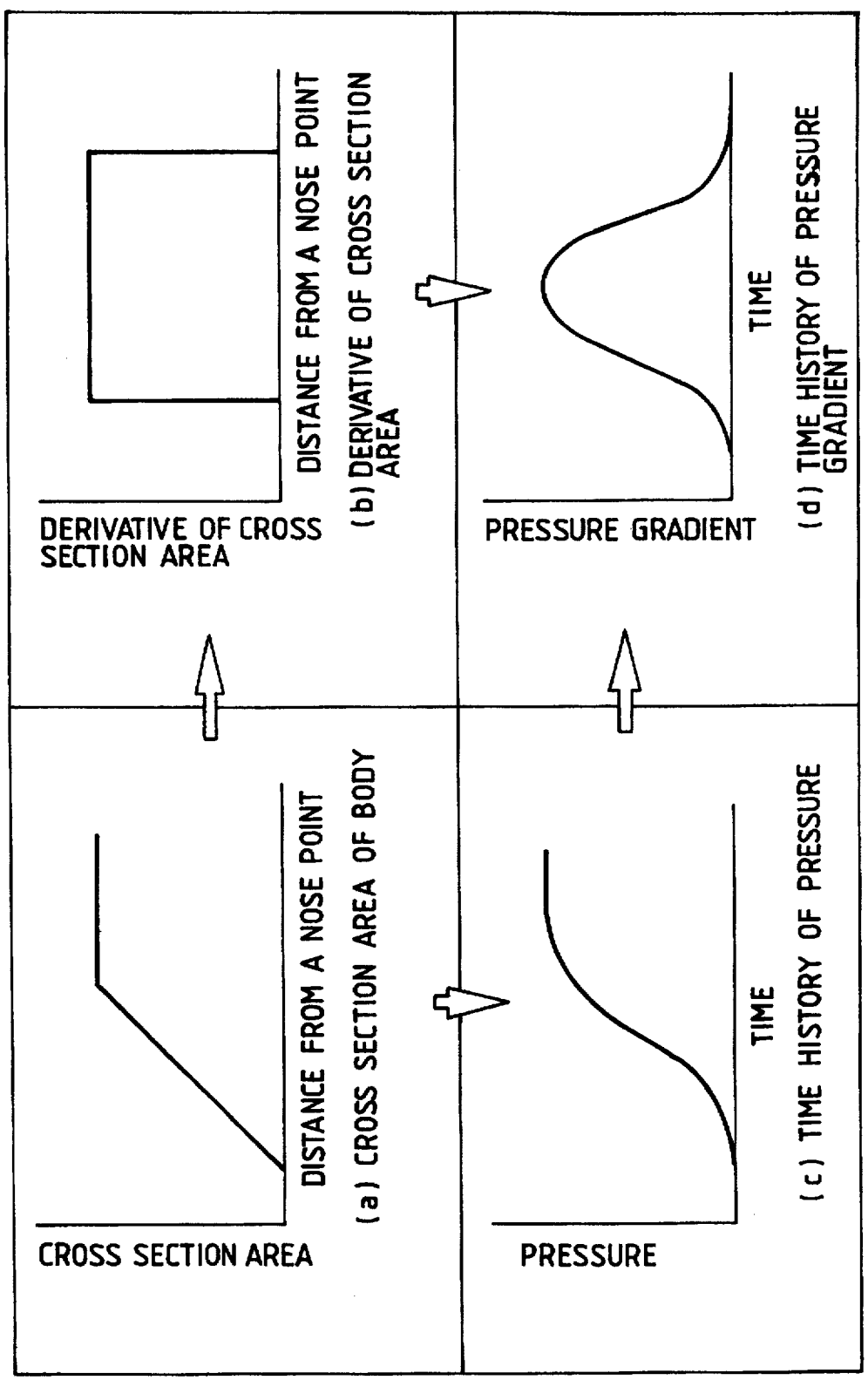
FIG. 2 is a schematic view of the theory representing the principle of the present invention.

FIG. 2 schematically shows the concept forming the basis of the theory of the present invention. There is a correlation between the car body shape and the micro pressure wave, as already described. The theory of the present invention is based on a method which determines this correlation using a paraboloid of revolution as the basic geometric shape, and obtains a pressure gradient change with time from the change of the car body sectional area.

As shown in FIG. 2(a), the car body cross-sectional area of a paraboloid of revolution increases in proportion to the distance from the distal end. The sectional area change rate can be obtained automatically by differentiating the car body cross-sectional area with respect to distance in the direction of distance. The sectional area change rate of the paraboloid of revolution is constant as shown in FIG. 2(b). On the other hand, the pressure change and the pressure gradient change with time for a paraboloid of revolution have been considered by the reference 1 as a basic experiment relating to the micro pressure wave, as shown in FIGS. 2(c) and 2(d), respectively. Therefore, the sectional area change rate and the pressure gradient change with time are allowed to correspond to each other, and the function of correlation representing the relation between them is shown in FIG. 2(d). Accordingly, the pressure gradient change with time can be obtained from the sectional area change of the car body on the basis of this function of correlation, whatever the nose shape may be.

Figure 3:
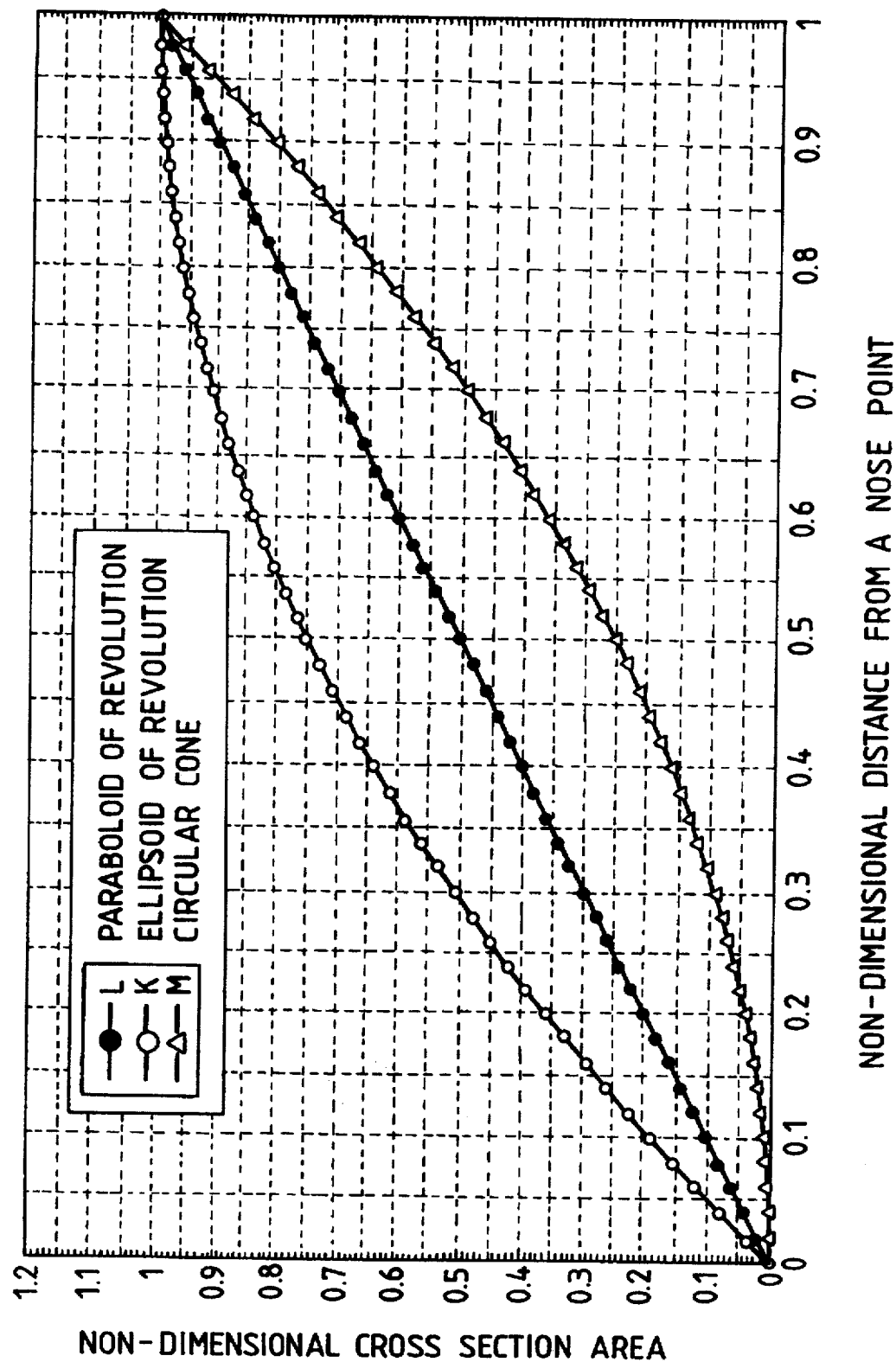
FIG. 3 is a diagram showing the relations between sectional areas of a paraboloid of revolution, a ellipsoid of revolution and a cone of revolution and the distance from the distal end.
Figure 4:
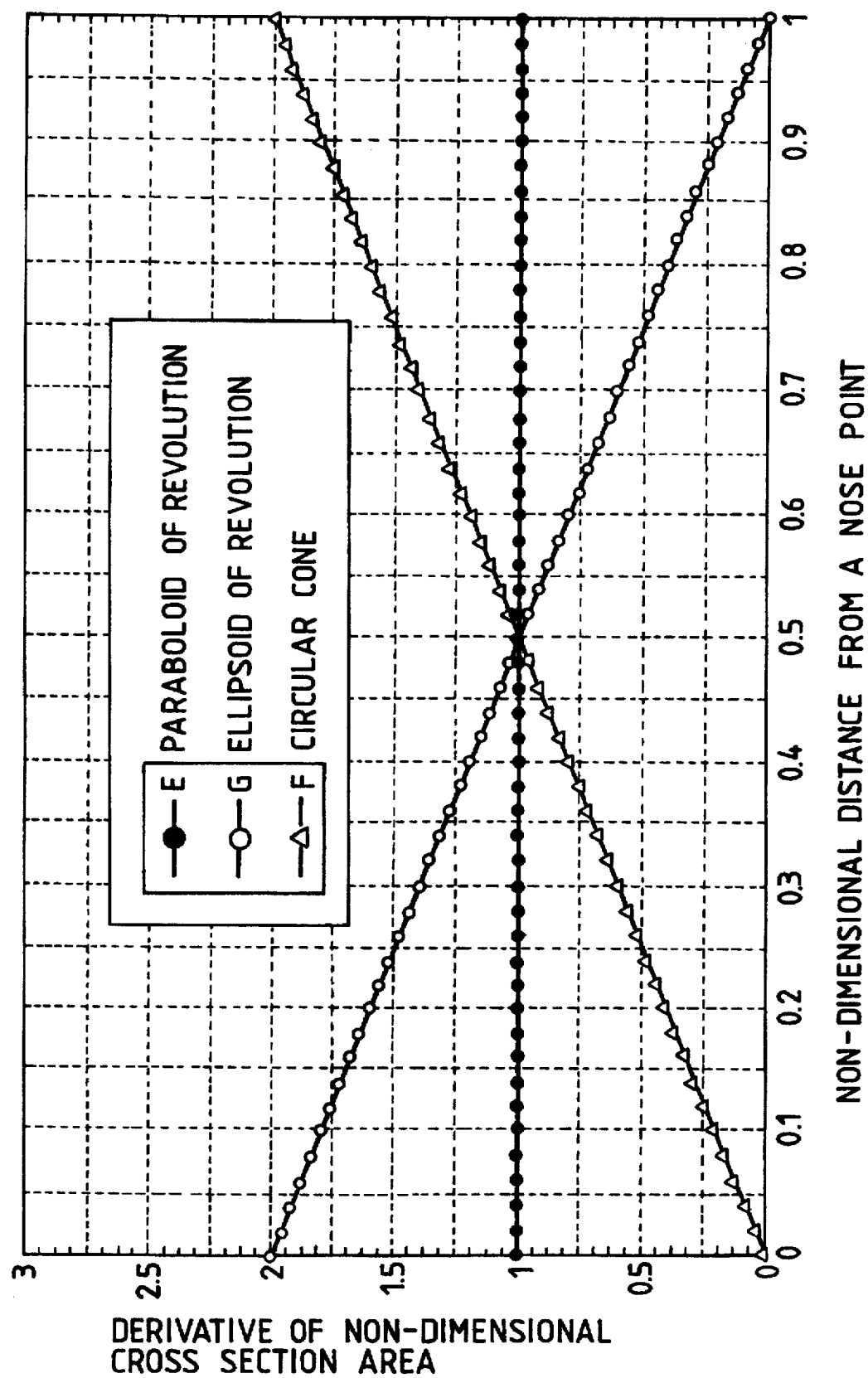
FIG. 4 is a diagram showing rate of change of a paraboloid of revolution, a ellipsoid of revolution and a cone of revolution.
Figure 5:
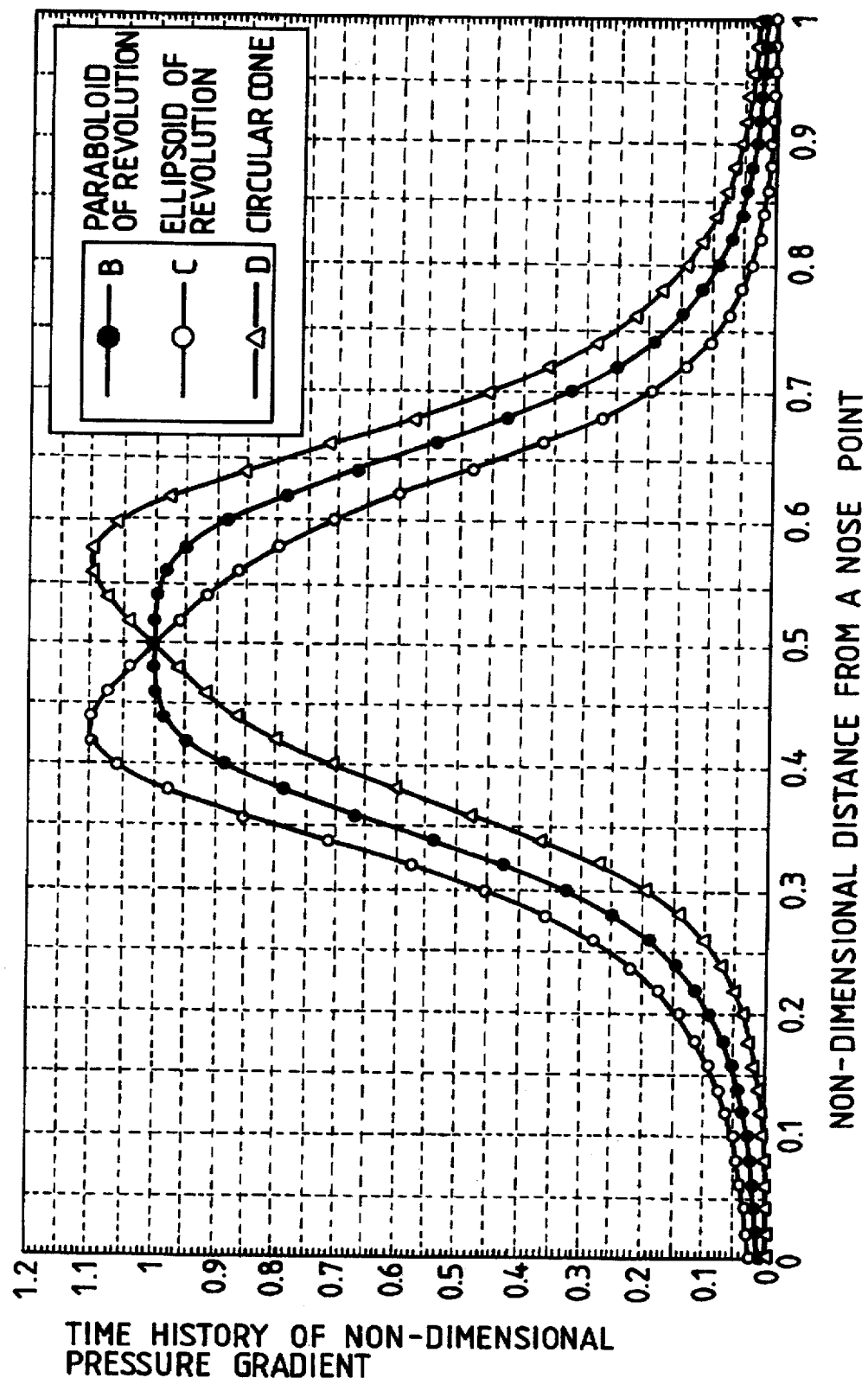
FIG. 5 is a diagram showing the pressure gradient change with time obtained by applying the theory representing the principle of the present invention.

As examples of the application of the present theory, the present theory will be applied to an ellipsoid of revolution and a cone of revolution, which represent other basic geometric shapes. FIG. 3 shows the changes of the sectional areas of the ellipsoid of revolution, the cone of revolution and the paraboloid of revolution, and FIG. 4 shows their sectional area change rates. FIG. 5 shows the pressure gradient change with time obtained by multiplying the sectional area change rate by the function of correlation. As can be clearly seen for FIG. 5, the maximum value of the pressure gradient change with time is mutually equal between the ellipsoid of revolution and the cone of revolution, and its position moves back and forth with the center of the tip distance as the boundary. Thus, the sectional area change rate of the ellipsoid of revolution becomes maximal at the tip and minimal at the rear end while the opposite, relationship occurs in the cone of revolution, as shown in FIG. 4. It is of greater importance that the maximum value of the pressure gradient change with time for both the ellipsoid of revolution and the cone of revolution is greater than that of the paraboloid of revolution. In other words, it is the paraboloid of revolution that has the minimum pressure gradient change with time among these three shapes. The result obtained by using the theory of the present invention agrees with the experimental result described in the reference 1 and this fact evidences that the theory of the present invention is effective.

It can be concluded from the result described above that the most desirable nose shape for reducing the pressure gradient change with time of the micro pressure wave is the paraboloid of revolution. When the running speed of the vehicle is low and the micro pressure wave is not strong, the distance over which the nose shape changes need not be elongated. Therefore, no practical problem occurs even with the paraboloid of revolution. As the vehicle speed becomes higher, however, the distance over which the car body cross-sectional area changes must be elongated unavoidably, and the following problem results concerning the capacity of the vehicles in the case of the use of a paraboloid of revolution. In other words, the paraboloid of revolution cannot be considered optimal to secure a sufficient capacity necessary for the driver's cab and the passengers' room for the leading vehicle. From the aspect of securing of a sufficient capacity, the ellipsoid of revolution has a greater capacity than the paraboloid of revolution, but it involves the problem that the pressure gradient change with time is greater than that of the paraboloid of revolution.

Therefore, a nose shape which can secure the required capacity and has a small pressure gradient change with time, such as the paraboloid of revolution, becomes optimal. According to the theory described above, the function of correlation reaches a maximum before and behind the center of the tip distance. Therefore, this problem can be solved by making the sectional area change rate small in the intermediate region and making it great in both the tip region and the rear region. In other words, it can be appreciated that the nose shape may be constituted by combining a plurality of paraboloids of revolution having mutually different sectional change rates.

Figure 6A:
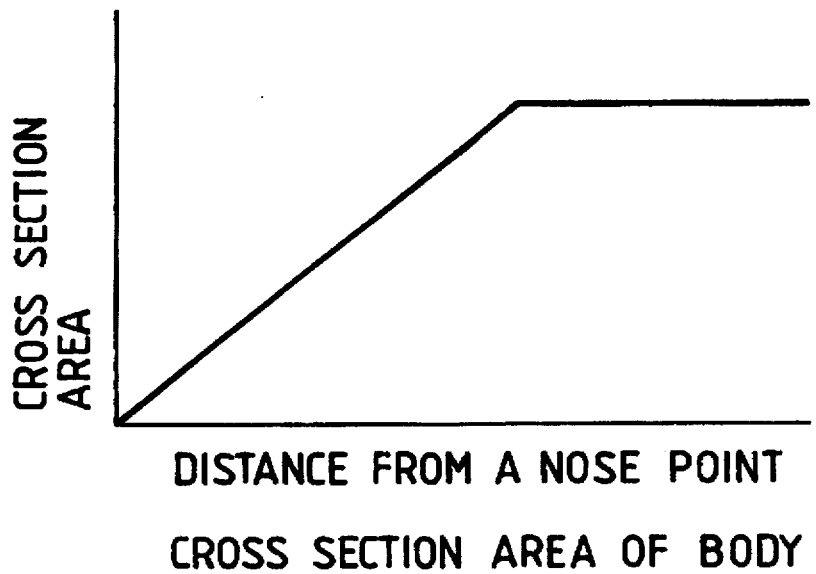
FIGS. 6(a) and 6(b) are diagrams relating to a one-stage parabolic sectional shape.
Figure 6B:
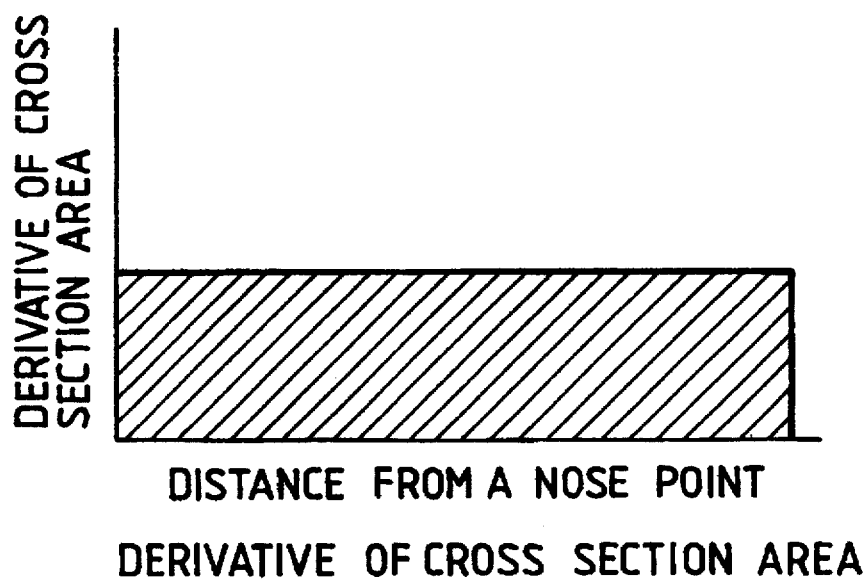

FIG. 6(a) relates to a car body cross-sectional area in the form a of paraboloid of revolution and its sectional area change rate. Since the nose shape is constituted by only one paraboloid of revolution, this shape will be referred to as a "one-stage parabolic sectional area shape". Similarly, the nose shape constituted by N paraboloids of revolution will be hereinafter referred to as an "N-stage parabolic sectional area shape". Here, the area encompassed by oblique lines (the integration value of the change rate of the sectional area) is equal to the sectional area and is therefore always constant. However, as indicated above with this nose shape, it has been difficult to secure an effective capacity for the driver's cab and the passenger's room.

Therefore, the nose portion may be divided into three parts, and the sectional area change rate of the intermediate region, which contains the position at which the car body cross-sectional area is a half of the maximum car body cross-sectional area, may be set to be greater than that of the tip region and the sectional area made as great as possible within a short distance range at the portion where the car body sectional area is relatively small with respect to a tunnel to address the capacity problem. Further, the sectional area change ratio may be made smaller than that of the tip portion in the intermediate region containing the position at which the sectional area is about a half of the maximum car body cross-sectional sectional area, which is relatively great with respect to a tunnel. In this way, the pressure gradient of the micro pressure wave can be made gentle. Further, when the driver's cab is disposed in the intermediate region and the windshield is formed, recess portions are formed below both side portions of the windshield in order to secure a sufficient visibility angle of the windshield so that the gradient of the pressure wave can be made gentle and the field of view of the windshield of the driver's cab can be secured.

Hereinafter, a plurality of embodiments of the present invention will be explained.

Figure 7A:
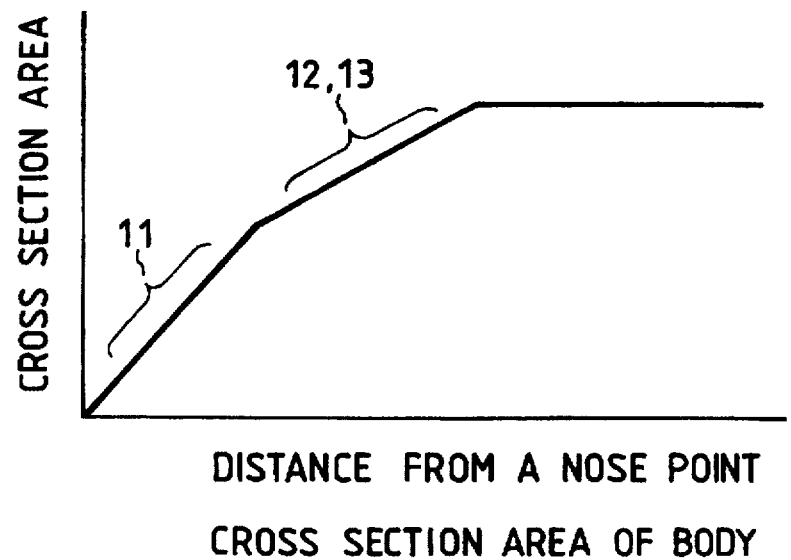
FIGS. 7(a) and 7(b) are diagrams relating to a two-stage parabolic sectional area shape to which the present invention is applied.
Figure 7B:
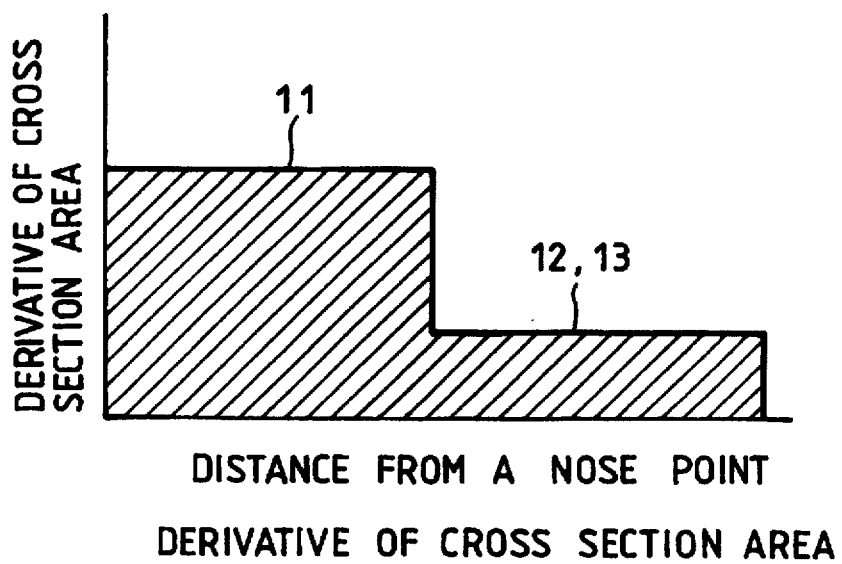

FIG. 7(a) shows an example of a the shape of two-stage parabolic sectional area (the nose shape of which is formed by two paraboloids of revolution) to which the present invention is applied. A sectional area change rate is increased in a tip region 11 because the function of correlation is small, and is decreased in an intermediate region 12 where the function of correlation is great. The sectional area change rate of a rear region 13 is equal to that of the intermediate region 12. Because the sectional area change rate of the tip region is great, a necessary capacity can be secured for a driver's cab. Further, because the change rates of the cross-sectional areas of the intermediate region 12 and the rear region 13 can be made small, the pressure gradient change with time can be made smaller than that of the one-stage paraboloid sectional shape.

The problem with the two-stage parabolic sectional area shape is that the intermediate region 2 is limited because the change rate of the car body cross-sectional area of the rear region 13, which is equal to that of the intermediate region 12, must be small even though the rear region 13 has a small function of correlation.

Figure 8A:
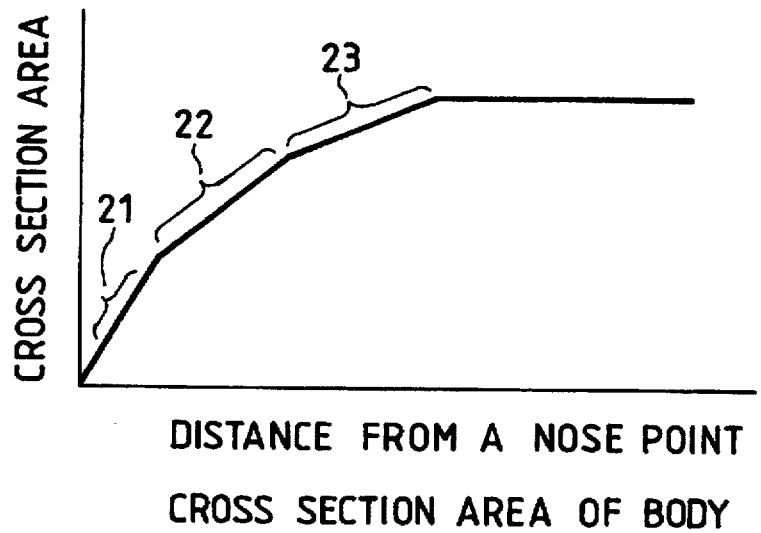
FIG. 8(a) and 8(b) are diagrams relating to a three-stage parabolic sectional area shape to which the present invention is applied.
Figure 8B:
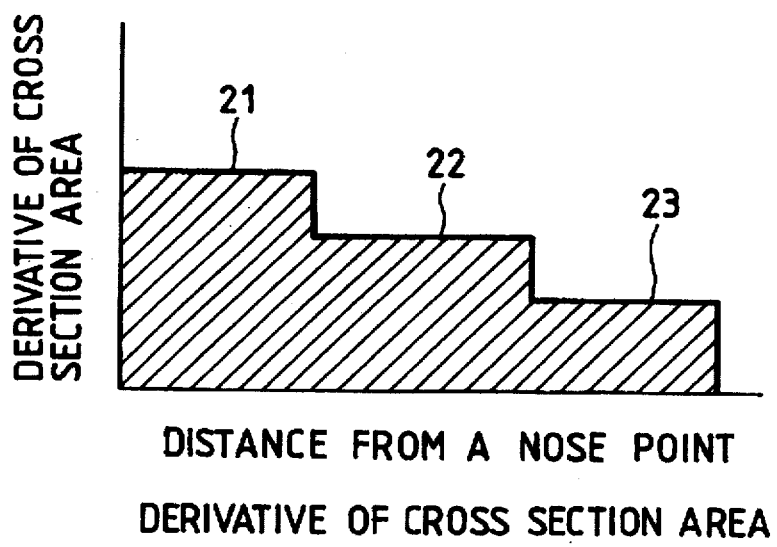

FIG. 8(a) shows an example of a three-stage parabolic sectional area shape as an example of the application of the present invention for solving this problem. In this example, the intermediate region 22, which is important for reducing a micro pressure wave and contains a position at which the car body cross-sectional area is a half of the maximum car body cross-sectional area, is determined independently of the tip region 21 and the rear region 23, and the change rate of its car body cross-sectional area is set. The tip region 21, intermediate region 22 and rear region 23 are constituted by dividing the portion at which the car body cross-sectional area changes in the longitudinal direction of the car body, that is, the nose portion, into substantially three equal portions in the car body longitudinal direction. The intermediate region 22 contains the position at which the car body cross-sectional area is a half of the maximum car body cross-sectional area, and is set to the range which exerts remarkable influences on the increase/decrease of the pressure gradient of the micro pressure wave in the car body longitudinal direction at that position.

The effect brought forth by this three-stage parabolic sectional shape is that the necessary capacity for the driver's cab can be secured without increasing the length of the nose portion corresponding to the increase of the pressure gradient of the micro pressure wave. This shape is extremely effective in practice because a good visibility from the driver's cab can be secured by the increase of the capacity of the portion ranging from the intermediate region 22 to the rear region 23.

The effectiveness of the three-stage parabolic sectional area shape, which changes the change rate of the car body cross-sectional area in three stages, will be explained next with reference to the case where the vehicle enters the tunnel.

The car body cross-sectional area of the nose region 21 of the car body is smaller than a tunnel opening area, and the influences on the micro pressure wave at the time of entry to a tunnel are small. Accordingly, even when the change rate of the car body cross-sectional area at this portion is made relatively great, the degree of increase of the pressure gradient of the micro pressure wave can be made smaller than in the intermediate region 22. In other words, the quantity of air pushed aside at the time of entry into the tunnel is small in the tip region 21 of the car body, and the influences on the micro pressure wave are small even when the change rate of the car body cross-sectional area is made relatively great. On the other hand, the occupying ratio of the car body cross-sectional area of the intermediate region 22 of the nose portion in the tunnel opening area becomes great and consequently, the quantity of air pushed aside becomes great, so that the air pressure on the front surface of the nose portion of the vehicle at the time of entry into the tunnel rises. The pressure gradient of the micro pressure wave can be made gentle by reducing the sectional area change rate of the intermediate region 22 of the nose portion.

Figure 9:
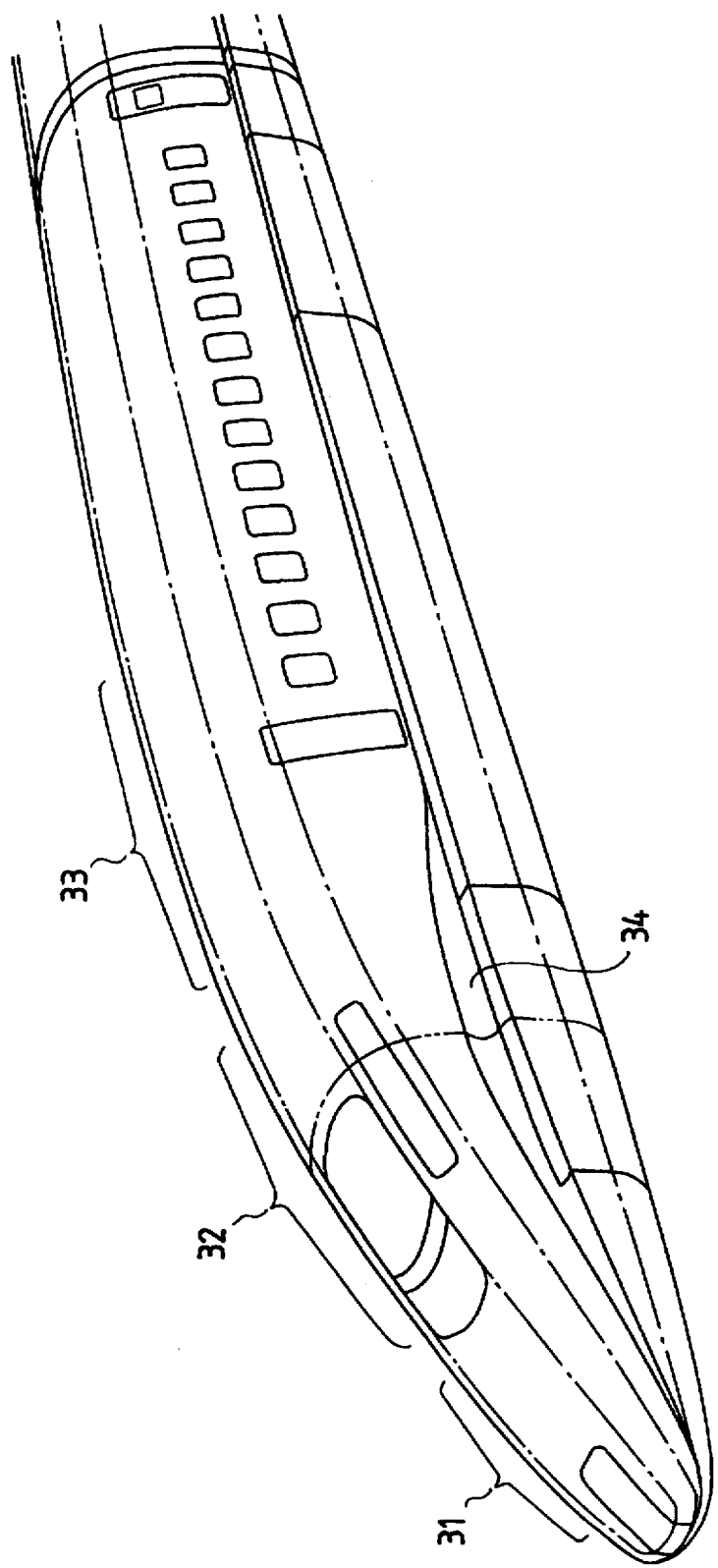
FIG. 9 is a perspective view showing in 3-D a car body shape having a three-stage parabolic sectional shape to which the present invention is applied.

Hereinafter, a concrete embodiment of the present invention based on the three-stage parabolic sectional shape shown in FIG. 8(a) will be explained with reference to FIG. 9. The car body has a nose shape comprising the tip region 31, the intermediate region 32 and the rear region 33. The car body width on the side surface of the driver's cab is made smaller than the width near the underframe in the intermediate region 32, and an angle to permit a good front visibility is secured for the windshield of the driver's cab. In other words, recess portions 34 are formed on both side surface portions of the driver's cab in the cross-sectional shape above the underframe. However, because a uniform height and a uniform width are necessary for the underframe portion up to the truck disposition position, a contraction of the car body width described above, that is, the recess 34 on both side surfaces of the driver's cab, are is formed on the side structure portion above the underframe, up to the truck disposition portion. The width can be reduced at portions on the distal end side of the truck disposition position.

According to the construction described above, the section change rate of the car body-cross-sectional area is increased in the tip region 31 in which the car body cross-sectional sectional area is relatively smaller than the tunnel section area, so as to secure the car body cross-sectional area within a short range in the car body longitudinal direction, and the section change rate of the car body cross-sectional area is decreased in the intermediate region where the car body cross-sectional area occupies a relatively large proportion with respect to the tunnel sectional area. In this way, the pressure gradient of the micro pressure wave can be made gentle. The pressure gradient of the micro pressure wave can be also made gentle by forming recess portions on both side surface portions of the driver's cab, and excellent visibility can be secured for the windshield of the driver's cab.

Figure 10A:
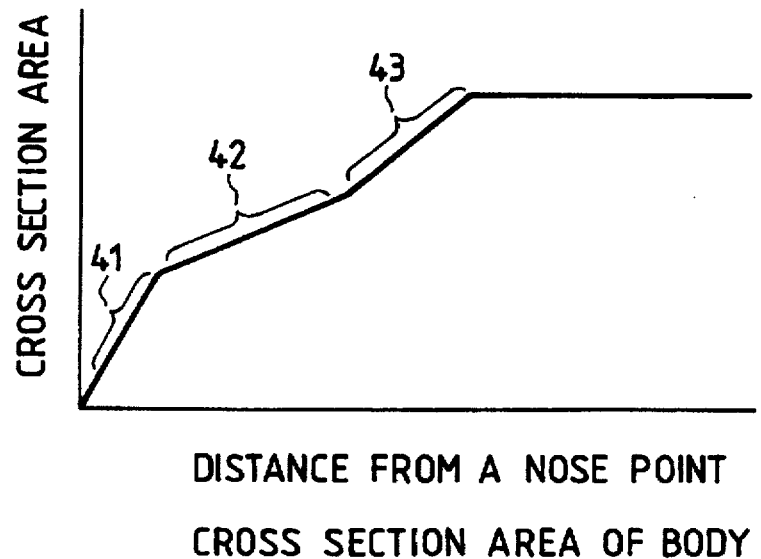
FIG. 10(a) and 10(b) are diagrams relating to of a three-stage parabolic sectional area shape to which the present invention is applied.
Figure 10B:
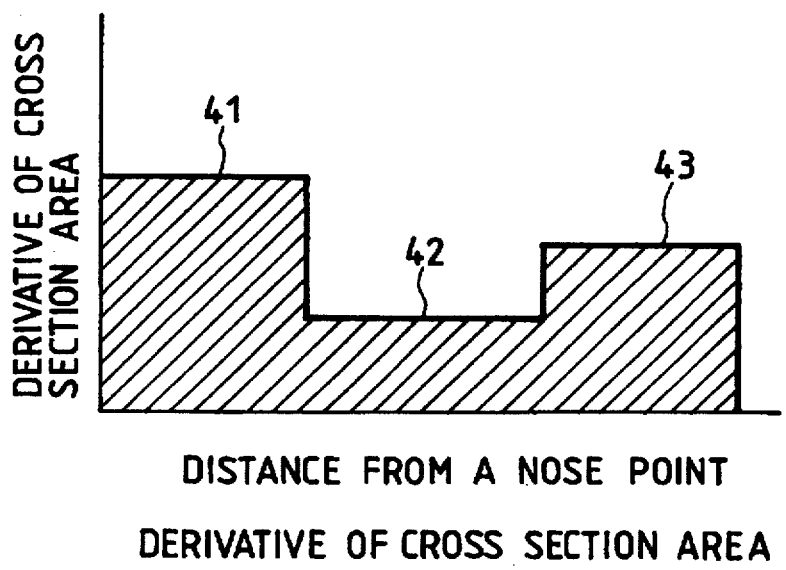

FIG. 10(a) shows another example of the three-stage parabolic sectional area shape to which the present invention is applied. In this example, the change rate of the car body sectional area in the intermediate region 42 can be made smaller than that in the tip region 41 and the rear region 43. Accordingly, the reduction effect of the micro pressure wave is great. Although it is difficult to secure visibility from the driver's cab in the intermediate region 42, the driver's cab can be installed in the rear region 43 if the visibility can be secured by operation through computer processing.

Figure 11A:
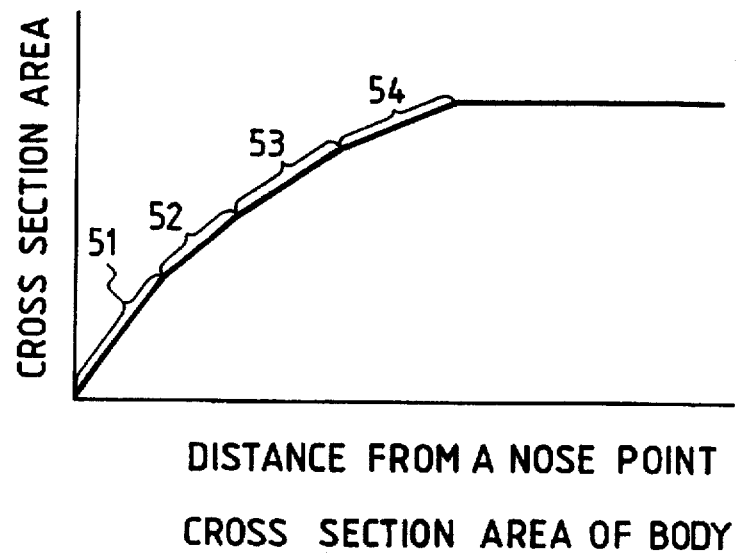
FIG. 11(a) and 11(b) are diagrams relating to a four-stage parabolic sectional area shape to which the present invention is applied.
Figure 11B:
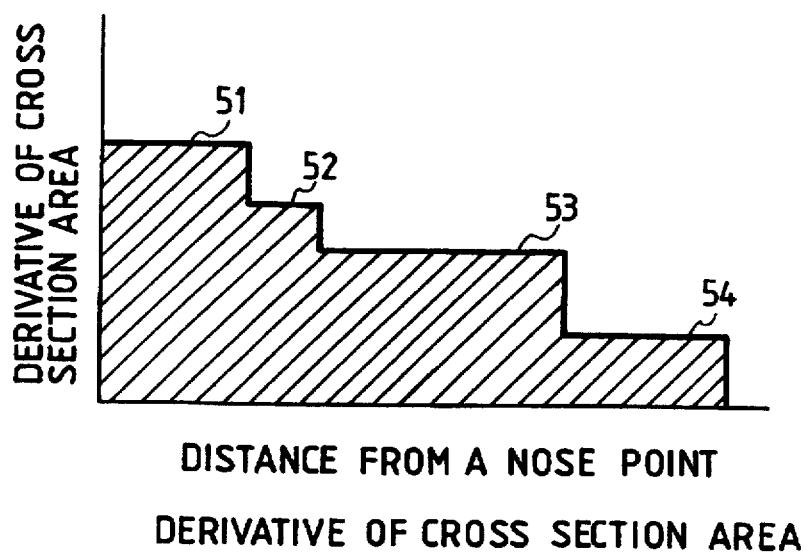

FIG. 11(a) shows an example of a four-stage parabolic sectional shape to which the present invention is applied. Since the number of stages increases in this embodiment, the change of the car body cross-sectional area can be made more freely. The basic concept is the same as that of the three-stage parabolic sectional shape, and the capacity of the driver's cab good the visibility via the windshield of the driver's cab can be secured. However, when the number of stages increases, the effect of reducing the micro pressure wave drops.

The present invention optimizes the nose shape on the basis of the theory that the micro pressure wave can be determined from the change rate of the car body cross-sectional sectional area of the nose shape, and can reduce the pressure gradient change with time of the desired micro pressure wave. Further, the capacity necessary for the driver's cab and the capacity for the cabin car of the leading vehicle can be secured even in the elongated nose portion while reducing the pressure gradient change with time of the micro pressure wave. Furthermore, sufficient visibility via the windshield of the driver's cab can be secured.

We claim:

1. A railway vehicle having a nose portion at which a car body cross-sectional area increases starting at the tip of the car body in a car body longitudinal direction, said nose portion comprising a tip region and an intermediate region, wherein said tip region exists on the distal end of a position at which a sectional area is a half of the maximum cross-sectional area of the car body, said intermediate region exists on the other end of said tip region in the car body longitudinal direction, the car body cross-sectional area changes at a predetermined sectional area change rate in said intermediate region, and the sectional area change rate throughout said tip region is greater than the sectional area change rate of said intermediate region, thereby reducing a pressure gradient change with time of a micro pressure wave produced when the railway vehicle enters a tunnel.

2. A railway vehicle having a nose portion at which a car body cross-sectional area increases starting at the tip of the car body in a car body longitudinal direction, said nose portion comprising a tip region, an intermediate region and a rear region, each region being trisected in the car body longitudinal direction, wherein the sectional area change rate throughout said tip region is greater than the sectional area change rate of said intermediate region, and the sectional area change rate of said rear region is greater than the sectional area change rate of said intermediate region, thereby reducing a pressure gradient change with time of a micro pressure wave produced when the railway vehicle enters a tunnel.

3. A railway vehicle having a nose portion at which a car body cross-sectional area is increased starting at the tip of the car body in a car body longitudinal direction, said nose portion comprising a tip region and an intermediate region, wherein said intermediate region contains the position at which the car body cross-sectional area is a half of the maximum car body cross-sectional area, and the sectional area change rate of said intermediate region is smaller than the sectional area change rate throughout said tip region, thereby reducing a pressure gradient change with time of a micro pressure wave produced when the railway vehicle enters a tunnel.

4. A railway vehicle according to claim 3, wherein a windshield of a driver's cab is formed in said intermediate region, and the inclination of said windshield of the driver's cab is set to an angle ensuring visibility ahead.

5. A railway vehicle having a nose portion at which a car body cross-sectional area progressively increases from the tip of the car body toward the other end in the car body longitudinal direction, said nose portion comprising a tip region, an intermediate region and a rear region, wherein said intermediate region contains the position at which the car body cross-sectional area is a half of the maximum car body cross-sectional area, and the sectional area change rates throughout said tip region and said rear region are greater than the sectional area change rate of said intermediate region, thereby reducing pressure gradient change with time of a micro pressure wave produced when the railway vehicle enters a tunnel.

6. A railway vehicle according to claim 5, wherein a windshield of a driver's cab is formed in said intermediate region, and the inclination of said windshield of the driver's cab is set to an angle ensuring visibility ahead.

7. A railway vehicle having a nose portion at which a car body cross-sectional area progressively increases from the tip of the car body toward the other end in the car body longitudinal direction, said nose portion comprising a tip region, an intermediate region and a rear region, wherein said intermediate region contains the position at which the car body cross-sectional area is a half of the maximum car body cross-sectional area and wherein a driver's cab is provided at said intermediate position above a truck disposition portion, wherein a height of said car body continuously increases in said nose portion, a width of said car body increases in said tip portion, and recesses are provided at side surface portions of said driver's cab above said truck disposition portion.

8. A railway vehicle according to claim 7, wherein a width of said driver's cab at said intermediate portion is not less than a maximum width of said car body at said tip portion.

9. A railway vehicle according to claim 7, wherein the sectional area change rate of said tip region is greater than the sectional area change rate of said intermediate region.

10. A railway vehicle according to claim 9, wherein the sectional area change rate of said rear region is greater than the sectional area change rate of said intermediate region.

* * * * *